(12) United States Patent
Son et al.

(10) Patent No.: US 10,721,467 B2
(45) Date of Patent: Jul. 21, 2020

(54) METHOD AND DEVICE FOR PROCESSING CODING UNIT IN IMAGE CODING SYSTEM

(71) Applicant: LG Electronics Inc., Seoul (KR)

(72) Inventors: Eunyong Son, Seoul (KR); Seoungwook Park, Seoul (KR); Yongjoon Jeon, Seoul (KR); Moonmo Koo, Seoul (KR)

(73) Assignee: LG Electronics Inc., Seoul (KR)

(*) Notice: Subject to any disclaimer, the term of this patent is extended or adjusted under 35 U.S.C. 154(b) by 57 days.

(21) Appl. No.: 15/569,597

(22) PCT Filed: Apr. 22, 2016

(86) PCT No.: PCT/KR2016/004198
§ 371 (c)(1),
(2) Date: Oct. 26, 2017

(87) PCT Pub. No.: WO2016/178485
PCT Pub. Date: Nov. 10, 2016

(65) Prior Publication Data
US 2018/0302616 A1    Oct. 18, 2018

Related U.S. Application Data

(60) Provisional application No. 62/157,446, filed on May 5, 2015.

(51) Int. Cl.
*H04N 19/107* (2014.01)
*H04N 19/13* (2014.01)
(Continued)

(52) U.S. Cl.
CPC ......... *H04N 19/107* (2014.11); *H04N 19/119* (2014.11); *H04N 19/122* (2014.11);
(Continued)

(58) Field of Classification Search
CPC ......... G06T 9/004; G06T 9/40; H04N 19/159; H04N 19/176; H04N 19/182; H04N 19/31;
(Continued)

(56) References Cited

U.S. PATENT DOCUMENTS

2012/0128260 A1*  5/2012  Jung .................... H04N 19/115
                                                   382/233
2013/0077691 A1*  3/2013  Zheng .................. H04N 19/105
                                                   375/240.16
(Continued)

FOREIGN PATENT DOCUMENTS

KR    10-2012-0005932    1/2012
KR    10-2013-0079261    7/2013

*Primary Examiner* — Aklilu K Woldemariam
(74) *Attorney, Agent, or Firm* — Fish & Richardson P.C.

(57) ABSTRACT

A method for decoding a picture, according to the present invention, comprises the steps of: receiving split flag information and merge flag information; splitting a coding unit (CU) of one or more depths n into CUs of depth n+1, on the basis of the split flag information; generating a merged CU by combining parts of the CUs of the depth n+1, on the basis of the merge flag information; and performing a decoding procedure for generating a restoration picture, on the basis of the generated merge CU. According to the present invention, a decoding procedure can be performed by merging CUs having similar characteristics, and thus auxiliary information to be received and processed is reduced and coding efficiency is improved.

8 Claims, 10 Drawing Sheets

(51) Int. Cl.
*H04N 19/122* (2014.01)
*H04N 19/124* (2014.01)
*H04N 19/70* (2014.01)
*H04N 19/176* (2014.01)
*H04N 19/119* (2014.01)
*H04N 19/46* (2014.01)

(52) U.S. Cl.
CPC ........... *H04N 19/124* (2014.11); *H04N 19/13* (2014.11); *H04N 19/176* (2014.11); *H04N 19/46* (2014.11); *H04N 19/70* (2014.11)

(58) Field of Classification Search
CPC ...... H04N 19/52; H04N 19/96; H04N 19/119; H04N 19/50; H04N 19/61; H04N 19/13; H04N 19/44; H04N 19/90; H04N 19/91; H04N 19/174; H04N 19/196; H04N 19/30; H04N 19/33; H04N 19/436; H04N 19/46; H04N 19/70; H04N 19/51; H04N 19/103; H04N 19/105; H04N 19/109; H04N 19/11; H04N 19/122; H04N 19/137; H04N 19/139; H04N 19/17; H04N 19/513; H04N 19/56; H04N 19/577; H04N 19/593; H04N 19/82; H04N 19/463; H04N 19/15; H04N 19/64; H04N 19/583; H04N 19/157; H04N 13/10; H04N 19/40; H04N 19/45; H04N 19/503; A63B 2053/0408; A63B 2053/0433; A63B 2053/0454; A63B 2053/0491; A63B 53/047; A63B 53/0475; A63B 60/54
USPC .............. 382/233, 238, 240, 242, 248, 236; 375/240
See application file for complete search history.

(56) References Cited

U.S. PATENT DOCUMENTS

| | | | |
|---|---|---|---|
| 2013/0142259 A1* | 6/2013 | Lim | H04N 19/64 375/240.12 |
| 2013/0156335 A1* | 6/2013 | Lim | H04N 19/52 382/238 |
| 2013/0177079 A1* | 7/2013 | Kim | H04N 19/593 275/240.12 |
| 2013/0230103 A1* | 9/2013 | Lim | H04N 19/176 375/240.12 |
| 2013/0259131 A1* | 10/2013 | Kondo | H04N 19/52 375/240.16 |
| 2013/0279820 A1 | 10/2013 | Cohen et al. | |
| 2013/0287104 A1* | 10/2013 | Jeong | H04N 19/197 375/240.12 |
| 2013/0343455 A1* | 12/2013 | Yamamoto | H04N 19/119 375/240.03 |
| 2014/0301467 A1* | 10/2014 | Thirumalai | H04N 19/513 375/240.16 |
| 2014/0301470 A1 | 10/2014 | Yie et al. | |
| 2015/0312588 A1* | 10/2015 | Yamamoto | H04N 19/105 375/240.15 |
| 2015/0334411 A1* | 11/2015 | Yamamoto | H04N 19/513 375/240.16 |
| 2016/0080745 A1* | 3/2016 | Kwak | H04N 19/593 375/240.12 |
| 2016/0191915 A1* | 6/2016 | Lim | H04N 19/105 375/240.02 |
| 2017/0318289 A1* | 11/2017 | Choi | H04N 19/176 |
| 2018/0041760 A1* | 2/2018 | Koo | H04N 19/96 |

* cited by examiner

METHOD AND DEVICE FOR PROCESSING CODING UNIT IN IMAGE CODING SYSTEM

CROSS-REFERENCE TO RELATED APPLICATIONS

This application is a National Stage application under 35 U.S.C. § 371 of International Application No. PCT/KR2016/004198, filed on Apr. 22, 2016, which claims the benefit of U.S. Provisional Application No. 62/157,446 filed on May 5, 2015, the contents of which are all hereby incorporated by reference herein in their entirety.

BACKGROUND OF THE INVENTION

Field of the Invention

The present invention relates to image compression techniques, and more particularly, to a method and device for processing a coding unit in an image coding system.

Related Art

The need for images of high resolution and high quality has recently been increasing in various fields. As the resolution and quality of an image is improved, the amount of data in the image is also likewise increased.

Due to the increase in the amount of information, devices with various performance and networks of various environments are emerging. With the emergence of devices with diverse capabilities and networks of diverse environments, it has become possible to use the same content at varying levels of quality.

Specifically, due to the fact that the image quality that the terminal device can support is diversified, and the network environment that is constructed becomes various, in some environments, images of general quality are used, while, in other environments, images of higher quality are available.

For example, a consumer who purchases video content from a mobile terminal may view the same video content on a larger screen and with a higher resolution using a large screen for home use.

In recent years, as broadcasts with HD (High Definition) resolution are being served, many users are already becoming accustomed to high resolution, high quality images, etc. In addition to HDTV, service providers and users are paying attention to UHD (Ultra High Definition) services that have more than four times the resolution of HDTVs.

SUMMARY OF THE INVENTION

The present invention provides a method and a device for enhancing image coding efficiency.

Another object of the present invention is to provide a method and a device for efficiently merging coding units.

Another aspect of the present invention is to provide a method and a device for merging coding units based on the depths of the coding unit.

Another aspect of the present invention is to perform an encoding/decoding procedure by combining a plurality of coding units into one coding unit based on characteristics of an image.

In accordance with one embodiment of the present invention, there is provided a method for decoding a picture by a decoder. The method comprises receiving split flag information, and merge flag information; splitting at least one CU (coding unit) on a depth n into CUs on a depth n+1 based on the split flag information; combining a predetermined number of the CUs on the depth n+1 based on the merge flag information to generate a merged CU; and performing a decoding procedure for generating a reconstructed picture based on the generated merged CU.

In accordance with one embodiment of the present invention, there is provided a decoder for decoding a picture. The decoder comprises a receiving module configured to receive split flag information, and merge flag information; and a processor configured to split at least one CU (coding unit) on a depth n into CUs on a depth n+1 based on the split flag information; to combine a predetermined number of the CUs on the depth n+1 based on the merge flag information to generate a merged CU; and to perform a decoding procedure for generating a reconstructed picture based on the generated merged CU.

In accordance with the present invention, the encoder may determine whether to merge CUs with similar characteristics, taking into consideration the characteristics of the image, and then may inform the decoder of the determination result. This allows the decoder to perform decoding procedures by merging the CUs with the similar characteristics. As a result, auxiliary information to be received and processed is reduced, and, thus, coding efficiency may be improved.

DETAILED DESCRIPTIONS

Figure 1:
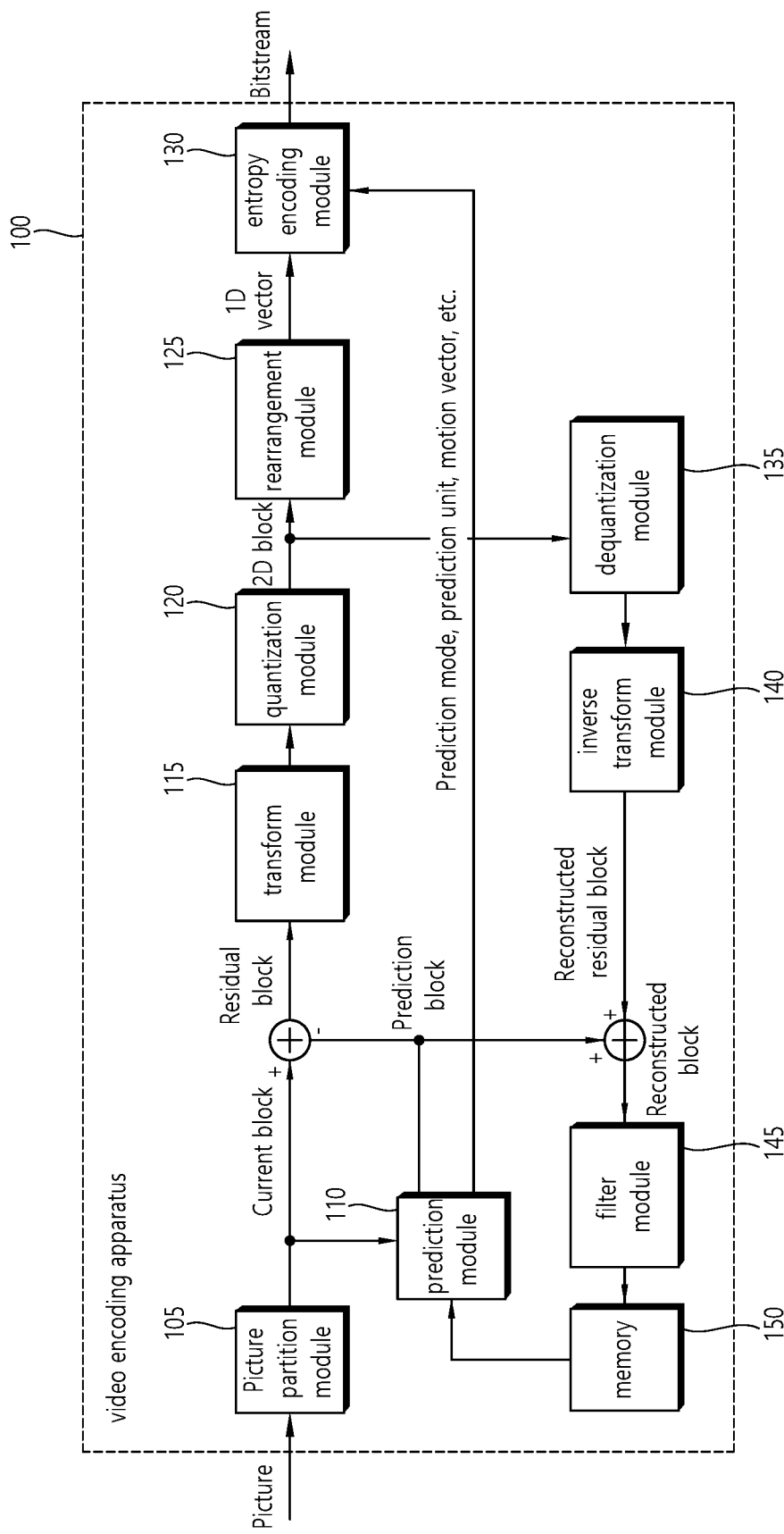
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filtering module 145, and a memory 150.

The picture partitioning module 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a lower depth as a quad-tree structures. The PU and TU may be obtained from the CU. For example, the PU may be partitioned from a CU into a symmetric or asymmetric square structure. Further, the TU may be split into a quad tree structure from the CU.

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block including a prediction sample or a prediction sample array. In the prediction module 110, the processing unit of a picture may be a CU, a TU, or a PU. The prediction module 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may be configured to entropy code the symbol according to a probability distribution based on the quantized transform values rearranged by the rearrangement module 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoding module 130 may store therein a table for performing entropy encoding, such as a variable length coding/code (VLC) table. The entropy encoding module 130 may perform entropy encoding using the stored VLC table. Further, the entropy encoding module 130 derives a binarization method of a corresponding symbol and a probability model of a corresponding symbol/bin, and then performs entropy encoding using the derived binarization method or probability model.

The entropy encoding module 130 may give a predetermined change to a parameter set or syntaxes to be transmitted, if necessary.

The dequantization module 135 dequantizes the values transform coefficients quantized by the quantization module 120. The inverse transform module 140 inversely transforms the values dequantized by the dequantization module 135.

The residual value or residual sample or residual sample array generated by the dequantization module 135 and the inverse-transform module 140, and the prediction block predicted by the prediction module 110 may be combined to form a reconstructed block including a reconstructed sample or a reconstructed sample array.

In FIG. 1, a residual block and a prediction block are added to create a reconstructed block by an adder. At this time, the adder may be considered as a particular module reconstructed block creating module that creates a reconstructed block.

The filtering module 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering module 145 may not perform a filtering operation on the reconstructed block used in the inter prediction.

The memory 150 may store the reconstructed block or picture calculated by the filtering module 145. The reconstructed block or picture stored in the memory 150 may be supplied to the prediction module 110 that performs the inter prediction.

Figure 2:
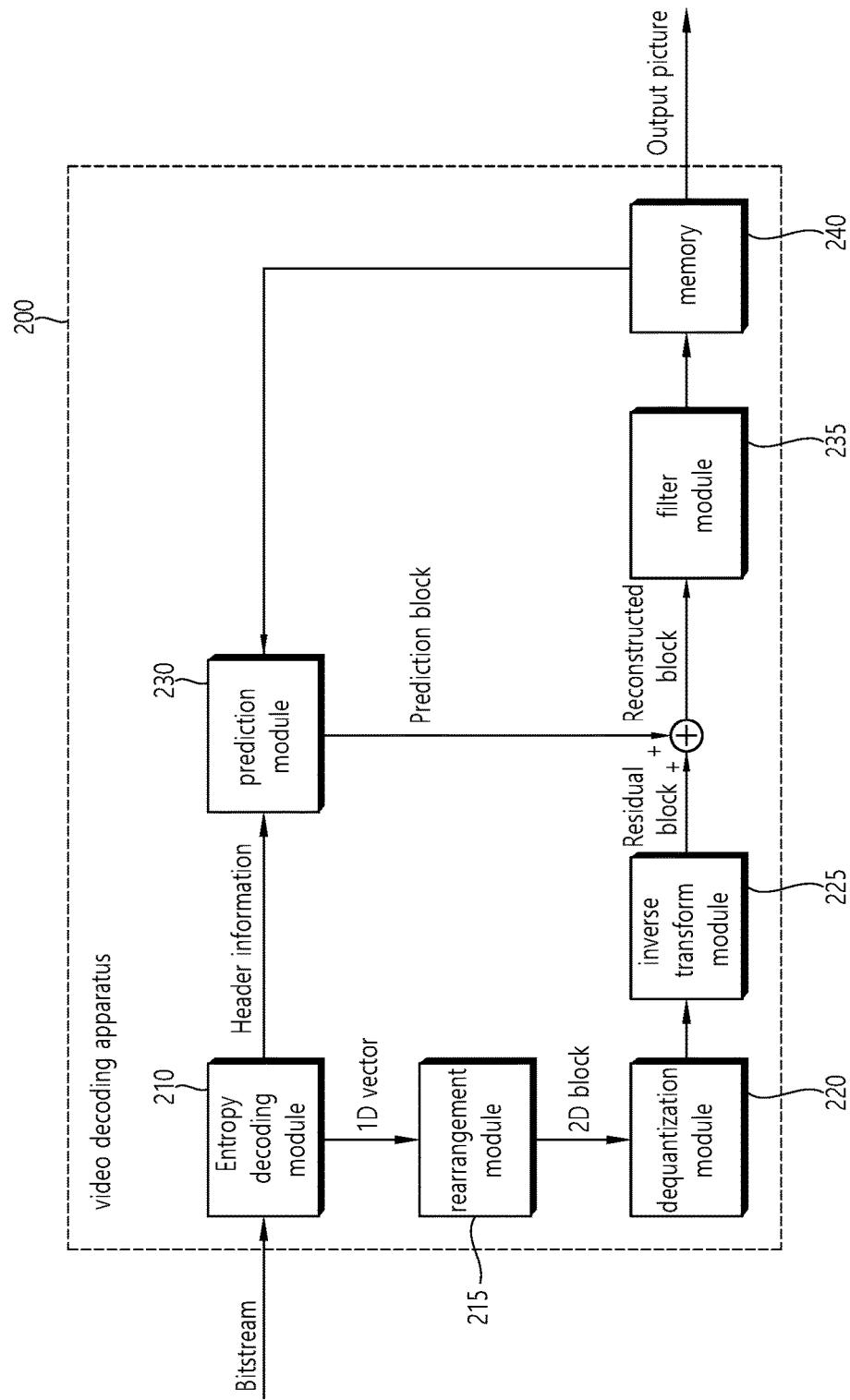
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filtering module 235, and a memory 240.

When a video bitstream is input from the video encoder, the input bitstream may be decoded on the basis of the order in which video information is processed by the video encoder.

The entropy decoding module 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoding module 210 may perform decoding using the same VLC table as the encoder used in the encoder. Further, when CABAC is used to perform entropy encoding in a video encoder, the entropy decoding module 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoder.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block transform block and the size of the transform block and may create an array of coefficients quantized transform coefficients in the form of a two-dimensional block.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder.

The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 generates a prediction block including a prediction sample or a prediction sample array based on the prediction block generation-related information provided by the entropy decoding module 210 and the previously decoded block and/or picture information provided from the memory 240.

If the prediction mode for the current PU is the intra prediction mode, the prediction module 230 may perform the intra prediction to generate a prediction block based on pixel information in the current picture.

If the prediction mode for the current PU is the inter prediction mode, the prediction module 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The prediction module 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In one example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor, encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which block's motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the prediction module 230 and the residual block provided by the inverse-transform module 225. FIG. 2 illustrates that using the adder, the prediction block and the residual block are combined to generate the reconstructed block. In this connection, the adder may be viewed as a separate module (a reconstructed block generation module) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

When the skip mode is used, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoding module 210, the rearrangement module 215, the dequantization module 220, the inverse transform module 225, the prediction module 230, the filtering module 235 and the memory 240 which are included in the decoding apparatus 200, for example, the entropy decoding module 210, the rearrangement module 215, the dequantization module 220, the inverse transform module 225, the prediction module 230, the filtering module 235, and so on may be expressed as a decoder or a decoding unit that is distinguished from other elements.

In addition, the decoding apparatus 200 may further include a parsing unit not shown in the drawing that parses information related to the encoded images included in a bitstream. The parsing unit may include the entropy decoding module 210, and may be included in the entropy decoding module 210. Such a parsing unit may also be implemented as an element of the decoding unit.

Figure 3:
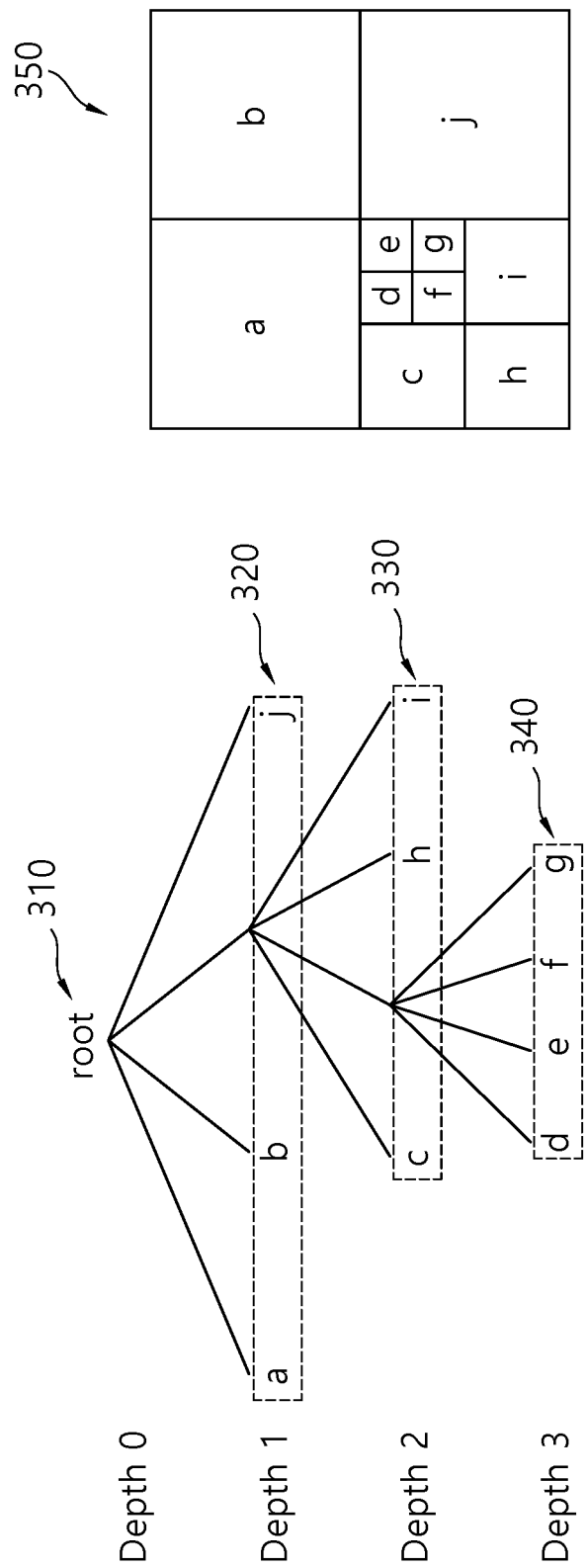
FIG. 3 shows the concept of coding unit split.

FIG. 3 shows the concept of coding unit split.

The coding unit means a basic unit for processing a picture in the above-mentioned course of processing images, for example, the course of intra/inter prediction, transform, quantization, and/or entropy coding. The size of a coding unit used in coding a picture may not be constant.

The encoder determines the coding units CU of the optimal form and size for each of the largest coding units based on the size and largest depth of the largest coding unit LCU, thereby constructing the coding units. In this case, since each of coding units may be partitioned or split into various prediction units and transform units, etc., the optimal coding unit may be determined with considering image characteristics. In this connection, the largest coding unit may be called the coding tree unit CTU, the coding tree unit may be called a coding tree block CTB, and the coding unit may be called a coding block.

The coding unit may have a rectangular form, and one coding unit may be split into several coding units again. For example, one coding unit with a size of 2N×2N may be split into 4 coding units with a N×N size again. The split process of the coding unit may be done recursively. Not all coding units need to be split into the same form. However, for convenience in terms of encoding and processing, there may be restrictions on the largest or smallest size of the coding unit. If the largest size of the coding unit is specified, this specified size is called the size of the largest coding unit, while if the smallest size of the coding unit is specified, this specified size is called the size of the smallest coding unit SCU.

For one coding unit, information indicating whether or not the corresponding coding unit is split may be specified thereto. For example, if the value of the split flag indicating whether or not the corresponding coding unit is split is 1, the corresponding coding unit is again divided into 4 coding units. If the value of the split flag is 0, the corresponding coding unit is not further divided, and the processing for the corresponding coding unit mat be performed. In this connection, prediction and transform may be performed based on the corresponding coding unit.

The split structure of the coding unit described above may also be expressed using a tree structure. For example, the split operation may be carried out using the largest coding unit as a root. The coding unit as currently split becomes the parent node, and the coding units split from the parent node becomes the child nodes. In this connection, the coding unit (parent node) as currently split has child nodes as many as the number of split coding units. The coding unit, which is no longer split, becomes a leaf node. A leaf node is a node without a child node.

Assuming that a square type split is performed on one coding unit, one coding unit may be split into up to four sub-coding units, so that the split structure of the coding unit will be a quad tree structure.

The encoder determines the largest and smallest coding unit sizes according to the characteristics of the video image (for example, resolution, etc.) or with considering the coding efficiency. Information that may be used to derive these largest and smallest coding unit sizes may be included in the bitstream. Further, a coding unit with a tree structure has depth information and may be split hierarchically. Each split sub-coding unit may have depth information. The depth information indicates the number of times the coding unit is split, and therefore, the depth information may include information on the size of the sub-coding unit.

For example, assuming that the maximum size of a coding unit and the maximum depth of a tree can be defined and square partitioning is performed, the size of a coding unit is half the size of a coding unit of a parent node, and it is thus available to acquire the minimum size of a coding unit by using the maximum size of a coding unit and the maximum depth information. Inversely, if the minimum size of coding units and the maximum depth of a tree are predefined, the maximum size of coding units can be derived and used. Since the size of a unit in square partitioning may be obtained in the form of multiple of 2, the actual size of a coding unit may be transmitted by being expressed as a logarithmic value to base 2, thereby enhancing transmission efficiency.

A decoder may acquire partition information on whether a current coding unit is partitioned. By acquiring the partition information under specific conditions or transmitting such information only under specific conditions in an encoder, the encoding/decoding efficiency can be enhanced. For example, if the current coding unit is the smallest coding unit SCU, the coding unit is not partitioned into smaller coding unit any more, and in this situation, it is not required to acquire the partition information.

Referring to FIG. 3, a highest coding unit 310 may be called a root node, and does not have a parent node. Accordingly, the highest coding unit 310 is a unit which is not partitioned from a coding unit which is higher than it, and may be the largest coding unit LCU. For example, the highest coding unit 310 may have the smallest depth value.

The highest coding unit 310 may be partitioned in a quad tree form. As a result, four lower coding units 320 that have a depth of level 1 may be generated. Here, at least one lower coding unit among the lower coding units 320 that have a depth of level 1 may be partitioned in a quad tree form, or may not be partitioned any more. That is, based on the highest coding unit 310, a coding unit may be recursively partitioned in a quad tree form until it reaches to the maximum depth or maximum level of the coding unit.

For example, as shown in FIG. 3, when a maximum allowable depth of a coding unit is level 3, the highest coding unit 310 may be recursively partitioned in a quad tree form up to a depth of level 3 and lower coding units 320, 330 and 340 may be generated. Here, the lower coding units 320, 330 and 340 are partitioned within the highest coding unit that is, one LCU, and may have the partitioned form shown as reference numeral 350 in FIG. 3.

Figure 4:
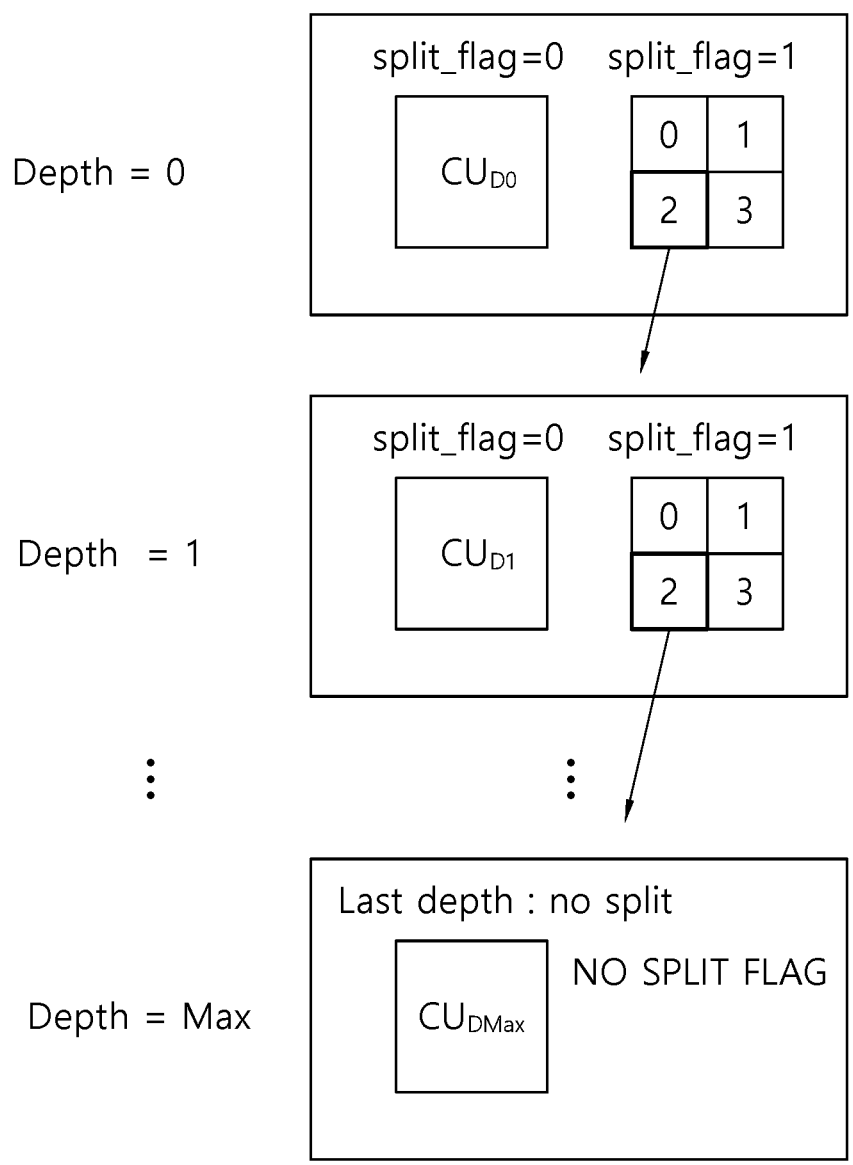
FIG. 4 shows an example of coding unit split.

FIG. 4 shows an example of a coding unit splitting operation.

Referring to FIG. 4, the coding unit CU of depth 0 is not split into lower coding units when the split flag is 0, while if the split flag is 1, the coding unit CU of depth 0 is split, in the quad tree structure, into four lower coding units with depth 1. In this connection, the four lower coding units may be indexed from 0 to 3 in a raster scan order.

For example, a 2-indexed coding unit having the depth 1 is not split into lower coding units if the split flag of the corresponding coding unit 410 is zero. If the split flag is 1, the 2-indexed coding unit having the depth 1 is split recursively into four lower coding units, each with depth 2, in the quad tree structure. Until the largest depth or last depth is reached, the coding unit may recursively continue to be split into lower coding units in the quad tree structure.

Figure 5:
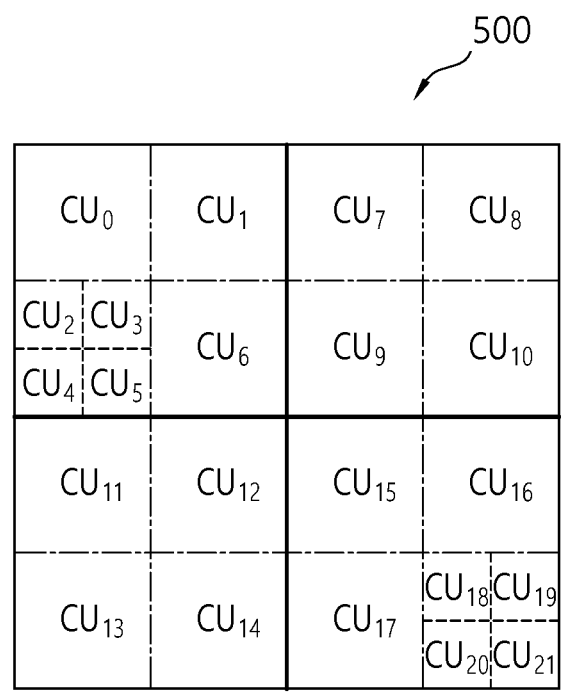
FIG. 5 shows an example of a CTU to which a quad tree structure is applied.

FIG. 5 shows an example of a CTU to which a quad tree structure is applied.

In the conventional video coding scheme, the coding unit size is fixed to a certain size (for example, 16×16). On the other hand, in the video coding system to which the present invention is applied, the size of the coding unit that can maximize the video compression efficiency may be determined adaptively based on the CU quad tree structure, by a rate-distortion (RD) optimization process at the encoder stage.

According to such a CU quad tree split method, in a region where the motion is small and the texture is simple, a large-sized coding unit is used to minimize redundant side information, whereas, in a region with many motions and complex texture, it is possible to minimize the residual signal via more accurate prediction based on the small sized coding unit.

Referring to FIG. 5, the CTU 500 may be split into various CUs according to a quad tree structure. In this connection, the CTU 500 may be viewed as an LCU, as described above, or may be processed as a single CU if it is not split according to image characteristics.

A thick straight line 510 indicates a split reference line for the CU (that is, CTU) on the depth 0 when the split flag is 1. A one-dot chain line 520 indicates a split reference line for the CU on the depth 1 when the split flag is 1. A dashed line 530 represents a split reference line for the CU on the depth 2 when the split flag is 1.

That is, the CU (8N×8N size) on a depth 0 is split into 4 CUs (each with 4N×4N size) on a depth 1 when the split flag thereof is 1. Further, the split flag is determined again for each depth 1 CU. If the split flag for the corresponding depth 1 CU is 1, the corresponding CU with the depth 1 are split into 4 CUs (each with 2N×2N size) on a depth 2. For CUs with the depth 2, the split flag is again determined. If the split flag for the corresponding depth 2 CU is 1, the corresponding CU with the depth 2 are split into 4 CUs (each with N×N size) on a depth 3.

In FIG. 5, one CTU is split into lower 22 CUs in total; each of CU2 to CU5, and CU18 to CU21 is divided into CUs on the depth 3, and each of the remaining CUs is split into CUs of depth 2.

According to the CU quad tree split method, based on the split flag of each CU, the area of each CU is divided. In this case, though, for example, CU1, CU6, CU7, and CU9 contains the same object, for example, uses similar motion information, or have their similar texture characteristics, CU1, CU6, CU7, and CU9 cannot be coded into one CU.

According to the present invention, an improved quad tree structure is provided, which allows the CUs with similar characteristics to be merged and coded into one CU.

Figure 6:
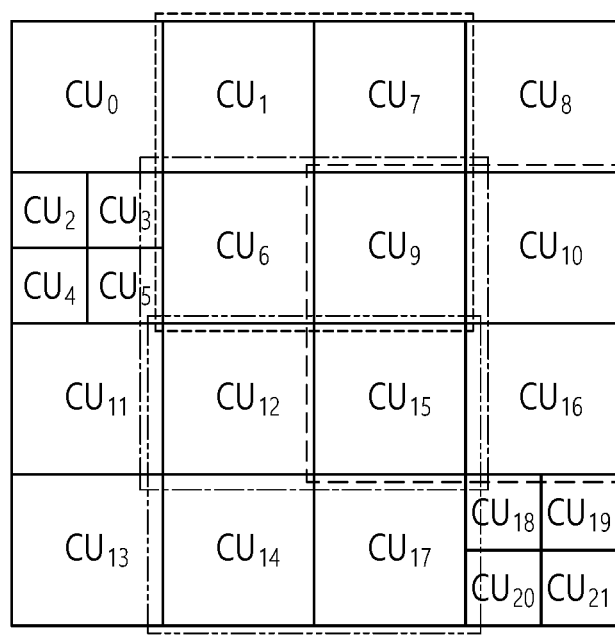
FIG. 6 illustrates an exemplary improved quad tree structure in accordance with an example of the present invention.

FIG. 6 illustrates an exemplary quad tree structure in accordance with an example of the present invention. FIG. 6 is based on a case where CUs are split as shown in FIG. 5.

Referring to FIG. 6, lower CUs belonging to different upper CUs respectively may be merged into one CU. For example, $CU_1$, $CU_6$, $CU_7$, $CU_9$ may be merged into one $CU_A$; $CU_6$, $CU_9$, $CU_{12}$, $CU_{15}$ may be merged into one $CU_B$; $CU_{12}$, $CU_{15}$, $CU_{14}$, $CU_{17}$ may be merged into one $CU_C$; or $CU_9$, $CU_{10}$, $CU_{15}$, $CU_{16}$ may be merged into one CUD.

In this case, the encoder and decoder may perform the coding procedure based on the $CU_A$, $CU_B$, $CU_C$, or CUD unit. Specifically, the encoder and the decoder may perform prediction and transform procedures based on the $CU_A$, $CU_B$, $CU_C$, or CUD unit. The encoder and decoder may partition/split the $CU_A$, $CU_B$, $CU_C$, or CUD unit into one or more PUs and TUs. In this case, a coding order different from the conventional coding order may be used.

The method for merging CUs as described above may be performed, for example, as follows.

Figure 7:
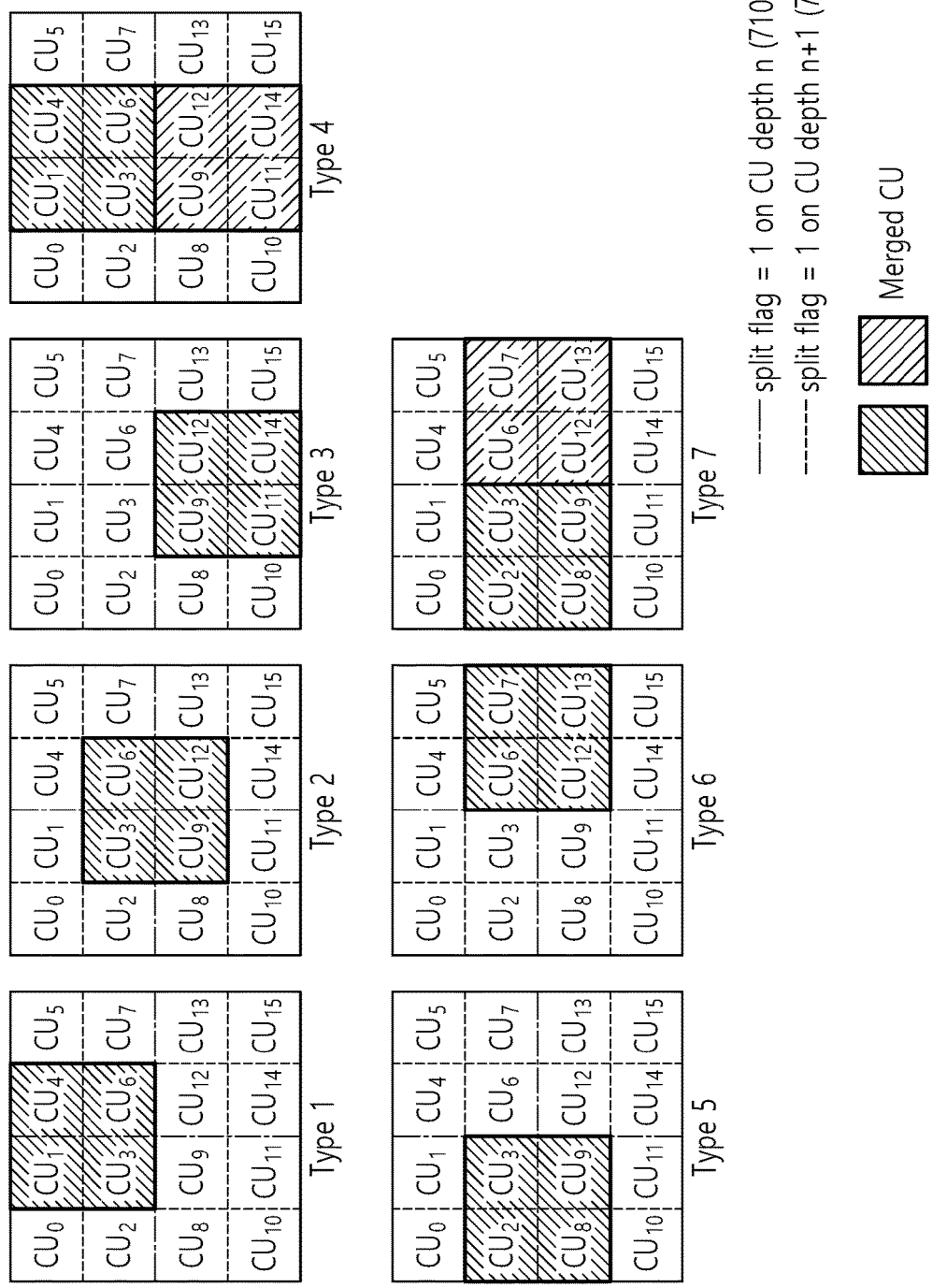
FIG. 7 schematically shows a CU merge method according to an example of the present invention.

FIG. 7 schematically shows a CU merge method according to an example of the present invention.

The decoder may determine whether the corresponding CU block has been split by parsing the split flag of the CU from the bit stream received from the encoder. The decoder may determine whether the split CUs are merged into a single CU by parsing the merge flag. In this connection, the merge flag may be called the quad tree merge flag qt_merge_flag.

In this connection, the dash-dotted line 710 indicates the split reference line when the split flag for the CU on depth n is 1. The dotted line 720 indicates the split reference line when the split flag for the CU on the depth n+1 is 1.

For example, if the split flag for the CU on depth n is 1, and thus, the CU on depth n is split into the CUs on the depth n+1, and the split flags for the CUs on the depth n+1 are 1, the CUs on depth n+1 may be further split into CUs on depth n+2. In this case, it is assumed that the CUs on the n+2 depth are no longer split into lower CUs. The CUs on the n+2 depth may be referred to as CU0 to CU15. In this case, as shown in FIG. 7, four adjacent CUs on the same depth (in this example, n+2 depth) may be combined to generate a merged CU. In this case, the merged CU may have a square shape.

As shown in FIG. 7, the CUs may be combined based on various types to generate a merged CU. In this case, only some of the various types may be selected according to the split form.

Further, in this case, not all CUs contained in a merged CU belong to the same upper CU. This because if all of the CUs which are merged together belong to the same upper CU, the encoder would not split the upper CU by setting the split flag for the corresponding upper CU to 0.

The merged CU may include a first CU, a second CU, a third CU, and a fourth CU. At least two of the first to fourth CUs may belong to different upper CUs. Specifically, for example, if the first to fourth CUs are all the CUs of the depth k, at least two of the first to fourth CUs may be CUs split from the different CUs on the k−1 depth. That is, the first to fourth CUs may be CUs derived from two or four upper CUs.

Figure 8:
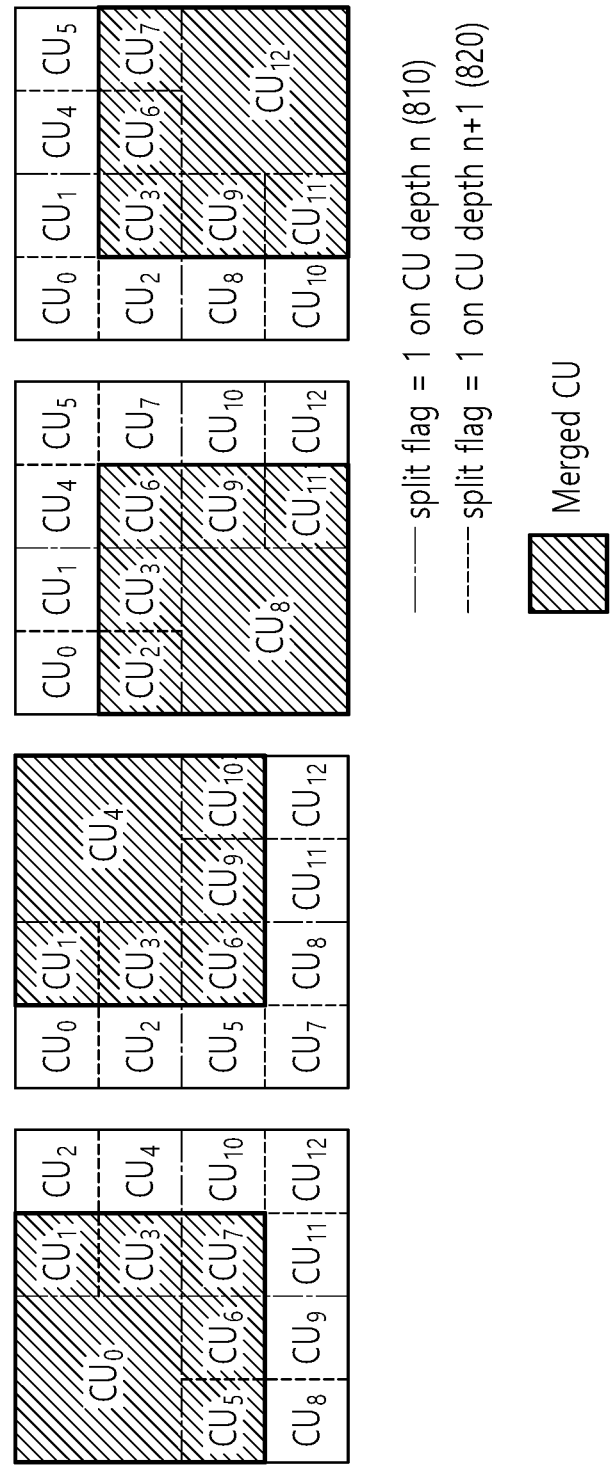
FIG. 8 schematically illustrates a CU merge method, according to another example of the present invention.

FIG. 8 schematically shows a CU merge method according to another example of the present invention.

Referring to FIG. 8, the one-dot chain line 810 indicates a line serving as a reference line for a splitting operation when the split flag for the CU of depth n is 1. A dotted line 820 indicates a reference line for the splitting operation when the split flag for the CU of depth n+1 is 1.

As shown in FIG. 8, when the split flag for the CU of depth n is 1, and thus, the CU of depth n is divided into four CUs on n+1 depth, and the split flags for three CUs among the four CUs on the n+1 depth are 1, and these three CUs are no longer split, and the split flags for the remaining CUs on the n+1 depth are zero, the CUs on the n+1 depth may be combined with five adjacent CUs on the n+2 depth to generate a merged CU. In this case, the merged CU may have a square shape.

Whether or not to use the merged CU as described above may be determined based on the RD optimization by the encoder stage. The encoder may encode a merge flag indicating the merging of specific CUs based on the determination result, and may include the encoded merge flag in the bitstream and transmit the bitstream to the decoder.

The followings refer to tables showing the syntaxes including information used for CU split and merge according to the present invention. The syntaxes may be included in the bitstream which is transmitted from the encoder to the decoder.

TABLE 1

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << | |

TABLE 1-continued

| coding_tree_unit( ) { | Descriptor |
|---|---|
| CtbLog2SizeY | |
| if( slice_sao_luma_flag || slice_sao_chroma_flag ) | |
| sao( xCtb >> CtbLog2SizeY, yCtb >> CtbLog2SizeY ) | |
| quadtree_split( xCtb, yCtb, CtbLog2SizeY, 0 ) | |
| quadtree_merge( xCtb, yCtb, CtbLog2SizeY, 0 ) | |
| coding_quadtree( xCtb, yCtb, CtbLog2SizeY, 0 ) | |
| } | |

Table 1 shows an example of coding tree unit syntax. The coding tree unit syntax includes split and merge information for one CTU. The syntax may include quadtree split information, quadtree merge information, and coding quadtree information.

TABLE 2

| quadtree_split( x0, y0, log2CbSize, cqtDepth ) { | Descriptor |
|---|---|
| if( x0 + ( 1 << log2CbSize ) <= pic_width_in_luma_samples && y0 + ( 1 << log2CbSize ) <= pic_height_in_luma_samples && log2CbSize > MinCbLog2SizeY ) | |
| split_cu_flag[cqtDepth][ x0 ][ y0 ] | ae(v) |
| if( cu_qp_delta_enabled_flag && log2CbSize >= Log2MinCuQpDeltaSize ) { | |
| IsCuQpDeltaCoded = 0 | |
| CuQpDeltaVal = 0 | |
| } | |
| if( split_cu_flag[ x0 ][ y0 ] ) { | |
| x1 = x0 + ( 1 << ( log2CbSize − 1 ) ) | |
| y1 = y0 + ( 1 << ( log2CbSize − 1 ) ) | |
| quadtree_split( x0, y0, log2CbSize − 1, cqtDepth + 1 ) | |
| if( x1 < pic_width_in_luma_samples ) | |
| quadtree_split( x1, y0, log2CbSize − 1, cqtDepth + 1 ) | |
| if( y1 < pic_height_in_luma_samples ) | |
| quadtree_split( x0, y1, log2CbSize − 1, cqtDepth + 1 ) | |
| if( x1 < pic_width_in_luma_samples && y1 < pic_height_in_luma_samples ) | |
| quadtree_split( x1, y1, log2CbSize − 1, cqtDepth + 1 ) | |
| } | |
| } | |

Table 2 shows an example of the quadtree split syntax. The corresponding syntax includes split flag information for the CU. The split flag information may be represented by a split_cu_flag syntax element.

The split flag information indicates whether the coding unit is split into coding units having a half horizontal size and a half vertical size. The cptDepth indicates the depth of the corresponding coding unit; x0, y0 represents the position x0, y0 of the top-left luma sample of the corresponding coding block with respect to the position of the top-left luma sample of the current picture. In the present invention, the term "top-left" may mean the leftmost and topmost of the corresponding region.

If the value of the split flag information indicates 1, the corresponding coding unit is split into a plurality of coding units, whereas if the value of the split flag indicates 0, the corresponding coding unit is not split.

TABLE 3

| quadtree_merge( x0, y0, log2CbSize, cqDepth ) { | Descriptor |
|---|---|
| if( split_cu_flag[cqtDepth][ x0 ][ y0 ] ) { | |
| x1 = x0 + ( 1 << ( log2CbSize − 1 ) ) | |

TABLE 3-continued

| quadtree_merge( x0, y0, log2CbSize, cqDepth ) { | Descriptor |
|---|---|
| y1 = y0 + ( 1 << ( log2CbSize − 1 ) ) | |
| x2 = x0 + ( 1 << ( log2CbSize − 2 ) ) | |
| y2 = y0 + ( 1 << ( log2CbSize − 2 ) ) | |
| x3 = x1 + ( 1 << ( log2CbSize − 2 ) ) | |
| y3 = y1 + ( 1 << ( log2CbSize − 2 ) ) | |
| if( ( split_cu_flag[cqtDepth+1][x0][y0] && | |
| split_cu_flag[cqtDepth+1][x1][y0] && | |
| !split_cu_flag[cqtDepth+2][x2][y0] && | |
| !split_cu_flag[cqtDepth+2][x2][y2] && | |
| !split_cu_flag[cqtDepth+2][x1][y0] && | |
| !split_cu_flag[cqtDepth+2][x1][y2] ) \|\| | |
| ( split_cu_flag[cqtDepth+1][x0][y1] && | |
| split_cu_flag[cqtDepth+1][x1][y1] && | |
| !split_cu_flag[cqtDepth+2][x2][y1] && | |
| !split_cu_flag[cqtDepth+2][x2][y3] && | |
| !split_cu_flag[cqtDepth+2][x1][y1] && | |
| !split_cu_flag[cqtDepth+2][x1][y3] ) \|\| | |
| ( split_cu_flag[cqtDepth+1][x0][y0] && | |
| split_cu_flag[cqtDepth+1][x0][y1] && | |
| !split_cu_flag[cqtDepth+2][x0][y2] && | |
| !split_cu_flag[cqtDepth+2][x2][y2] && | |
| !split_cu_flag[cqtDepth+2][x0][y1] && | |
| !split_cu_flag[cqtDepth+2][x2][y1] ) \|\| | |
| ( split_cu_flag[cqtDepth+1][x1][y0] && | |
| split_cu_flag[cqtDepth+1][x1][y1] && | |
| !split_cu_flag[cqtDepth+2][x1][y2] && | |
| !split_cu_flag[cqtDepth+2][x3][y2] && | |
| !split_cu_flag[cqtDepth+2][x1][y1] && | |
| !split_cu_flag[cqtDepth+2][x3][y1] ) ) | |
| qt_merge_flag[cqtDepth][ x0 ][ y0 ] | ae(v) |
| if( qt_merge_flag[cqtDepth] [ x0 ][ y0 ] ) | |
| qt_merge_type[cqtDepth] [ x0 ][ y0 ] | ae(v) |
| } | |
| } | |

Table 3 shows an example of the quadtree merge syntax. The corresponding syntax includes merge flag information and merge type information for the CU. The merge flag information may be represented by a qt_merge_flag syntax element, while the merge type information may be represented by a qt_merge_type syntax element. The merge flag information may be present, for example, only when a square merged CU can be derived, based on CUs on the same depth, or on CUs with depths whose depth difference is within 1, as described in the above table. Further, the merge type information may be present only when the merge flag information exists.

The merge flag information indicates whether or not a plurality of coding units are combined into one merged CU. The merge type information indicates the type of the corresponding merged CU. The merged CU may include various CUs having the same depth based on the type information. Alternatively, the merged CU may include CUs having different depths based on the type information.

For example, if the value of the merge flag information indicates 0, the split CUs are not merged and coding is performed according to the original split CU structure. If the value of the merge flag information indicates 1, the CU merging operation is performed according to the specific type based on the merge type information.

TABLE 4

| coding_quadtree( x0, y0, log2CbSize, cqtDepth ) { | Descriptor |
|---|---|
| if( split_cu_flag[cqtDepth][ x0 ][ y0 ] ) { | |
| x1 = x0 + ( 1 << ( log2CbSize − 1 ) ) | |
| y1 = y0 + ( 1 << ( log2CbSize − 1 ) ) | |
| if( !qt_merge[cqtDepth][ x0 ][ y0 ] ) | |
| coding_quadtree( x0, y0, log2CbSize − 1, | |

TABLE 4-continued

| coding_quadtree( x0, y0, log2CbSize, cqtDepth ) { | Descriptor |
|---|---|
| cqtDepth + 1 ) | |
| if( x1 < pic_width_in_luma_samples && | |
| !qt_merge[cqtDepth][ x1 ][ y0 ] ) | |
| coding_quadtree( x1, y0, log2CbSize − 1, | |
| cqtDepth + 1 ) | |
| if( y1 < pic_height_in_luma_samples && | |
| !qt_merge[cqtDepth][ x0 ][ y1 ] ) | |
| coding_quadtree( x0, y1, log2CbSize − 1, | |
| cqtDepth + 1 ) | |
| if( x1 < pic_width_in_luma_samples && | |
| y1 < pic_height_in_luma_samples && | |
| !qt_merge[cqtDepth][ x1 ][ y1 ] ) | |
| coding_quadtree( x1, y1, log2CbSize − 1, | |
| cqtDepth + 1 ) | |
| } else | |
| coding_unit( x0, y0, log2CbSize ) | |
| } | |

Table 4 shows the coding quadtree syntax. Depending on the corresponding syntax, multiple CUs may be derived from a single CU recursively in a quad tree structure. Based on whether the split operation or merge operation is to be performed, a final CU that is no longer split or merged anymore may be derived.

The final CU may be partitioned/split into at least one PU and TU, whereby procedures such as prediction and transform may be performed.

Although only the CU is referenced in the above embodiments, the present invention may be applied to a unit or block having another quadtree structure as well as the CU.

Figure 9:
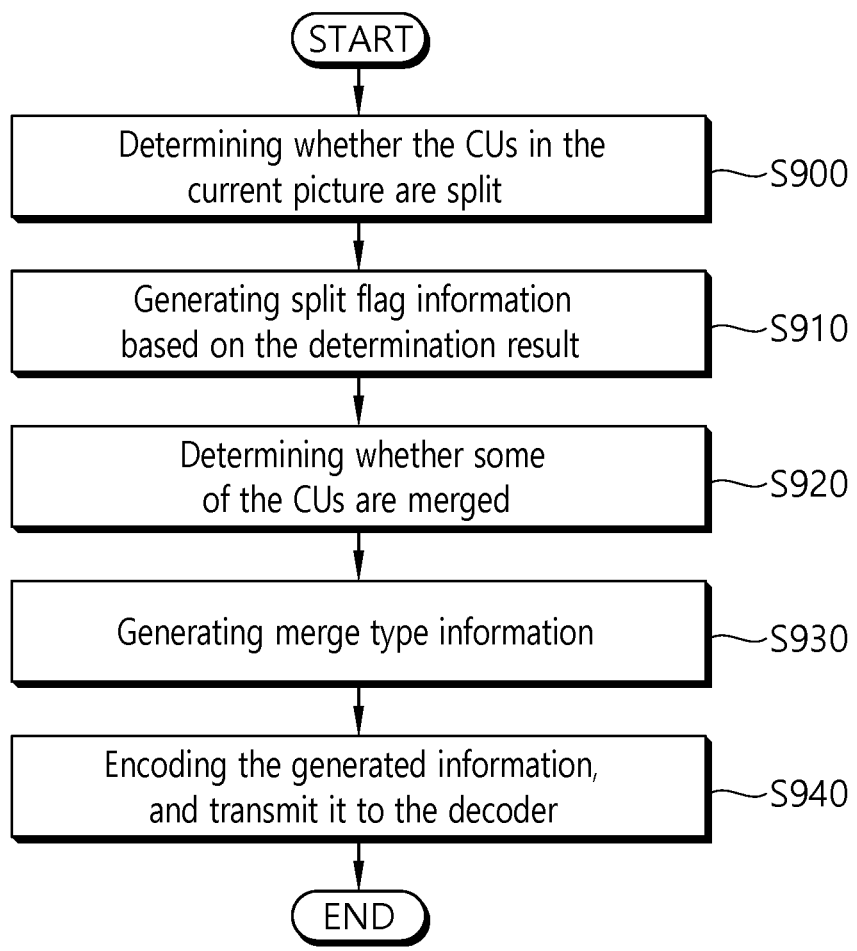
FIG. 9 is a flowchart schematically illustrating a picture encoding method performed by an encoder.

FIG. 9 is a flowchart schematically illustrating a picture encoding method performed by an encoder.

Referring to FIG. 9, the encoder determines whether the CUs in the current picture are split (S900). As described above, one picture is composed of CTUs which are the largest coding unit; CTUs may be split into CUs in a quad tree structure; the split CUs may be recursively split into lower CUs. Based on the CU quad tree structure, the encoder may adaptively determine the size of the coding unit that maximizes the coding efficiency based on the quad tree structure via the RD optimization process.

The encoder generates split flag information based on the determination result S910. The split flag information may include split flag syntax elements for CUs.

The encoder determines whether some of the CUs are merged S920. The encoder takes into consideration the characteristics of the image and then merges the CUs with similar characteristics based on the considerations so that one CU (merged CU) is coded. The CUs combined to generate the merged CU may include pixels for the same object. The merged CU may be configured in the manner as described above with reference to FIGS. 5 to 7.

The encoder generates split flag information based on the determination result S910. The split flag information may include split flag syntax elements for CUs.

The encoder encodes the split flag information and the merge flag information and transmits the encoded information in operation S920. The encoder may encode split flag information and merge flag information and transmit the encoded information to the decoder by including the encoded information in a bitstream.

Further, the encoder may generate merge type information S930. Then, in the operation S940, the encoder encodes the generated information, and transmits it to the decoder. The merge type information may be generated only when the value of merge flag information indicates 1.

Figure 10:
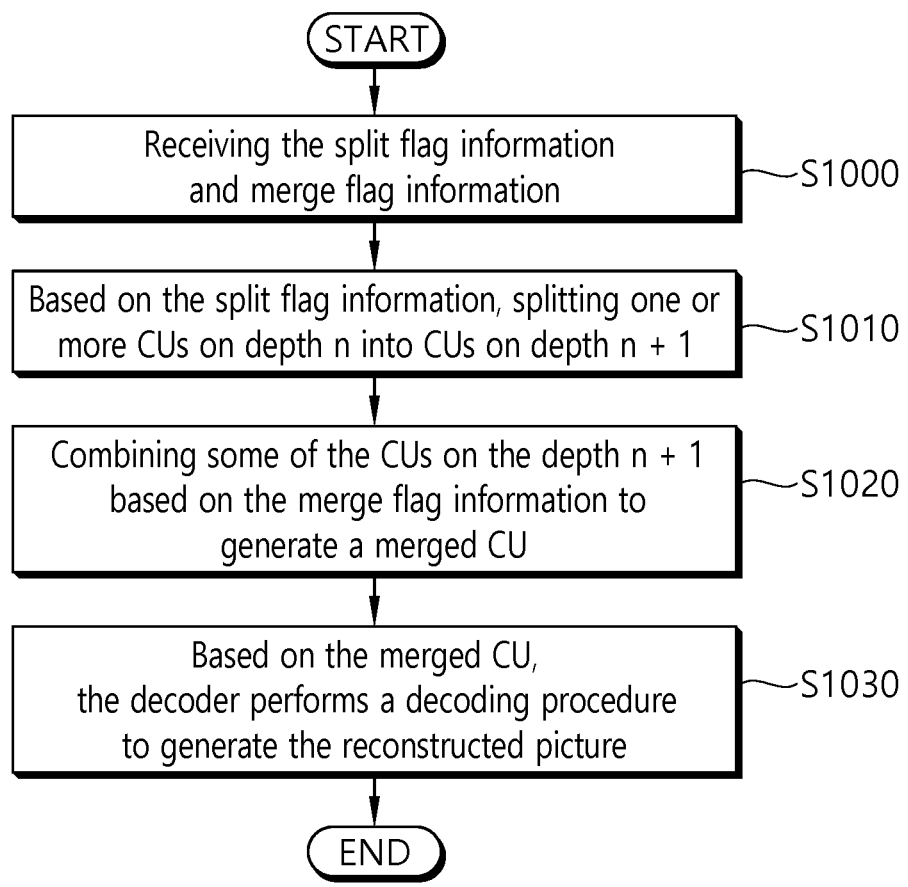
FIG. 10 is a flowchart schematically illustrating a picture decoding method performed by a decoder.

FIG. 10 is a flowchart schematically illustrating a picture decoding method performed by the decoder.

Referring to FIG. 10, the decoder receives the split flag information and merge flag information S1000. The decoder may parse the split flag syntax element and the merge flag syntax element from the bitstream, thereby obtaining the split flag information and the merge flag information. The decoder may also receive the merge type information. The decoder may further receive the merge type information if the value of the merge flag information indicates 1.

Based on the split flag information, the decoder splits one or more CUs on depth n into CUs on depth n+1 S1010. In this connection, the depth n CU is represented by $CU_n$, and the depth n+1 CU is represented by $CU_{n+1}$. That is, the decoder may split one or more $CU_n$s into multiple $CU_{n+1}$s. In this connection, $CU_n$ may have been split from $CU_{n-1}$, that is, the CU on depth n−1. If depth n is depth 0, the $CU_n$ may be CTU or LCU.

The decoder combines some of the $CU_{n+1}$s, that it, CUs on the depth n+1 based on the merge flag information to generate a merged CU S1020. The merged CU may have a square structure. The merged CU may have a non-square structure.

For example, the merged CU may be generated by combining four adjacent $CU_{n+1}$s among the $CU_{n+1}$s. In this case, the difference between the depths of the CUs combined to generate the merged CU may be zero.

For example, the four $CU_{n+1}$s may include a first $CU_{n+1}$, a second $CU_{n+1}$, a third $CU_{n+1}$, and a fourth $CU_{n+1}$. At least two of the first $CU_{n+1}$, second $CU_{n+1}$, third $CU_{n+1}$, and fourth $CU_{n+1}$ may be split from different $CU_n$ s.

Alternatively, the first $CU_{n+1}$, second $CU_{n+1}$, third $CU_{n+1}$, and fourth $CU_{n+1}$ may be split from different $CU_n$s respectively. This case includes the embodiment such as a type 2 of FIG. 7.

When the size of an arbitrary $CU_{n+1}$ is N×N, the size of the merged CU may be 2N×2N.

In another example, some of the $CU_{n+1}$s and $CU_n$s other than the $CU_n$s subjected to the splitting operation may be combined with each other to generate the merged CU. This case includes the above-described embodiment in FIG. 8. In this case, the CUs combined to generate the merged CU may have depths whose depth difference is within 1.

In this case, five $CU_{n+1}$s may be combined with the $CU_n$s other than the $CU_n$s subjected to the splitting operation, to generate the merged CU.

In this case, if the size of an arbitrary $CU_{n+1}$ is N×N, the size of the merged CU may be 3N×3N.

The decoder may determine the merge type of the merged CU based on the merge type information when receiving the merge type information.

Meanwhile, although the present embodiment has been described with reference to depth n and depth n+1, this depth relationship is relative. Thus, CUs of depth n+2 as described above may be merged. Alternatively, the CUs of depths that are lower or higher than CUs of depth n and depth n+1 may be merged.

Based on the merged CU, the decoder performs a decoding procedure to generate the reconstructed picture S1030. For example, the decoder may be configured to perform a procedure such as transform intra/inter prediction based on the merged CU, and then to generate a reconstructed sample for the corresponding merged CU, and then to generate a reconstructed picture based on the generated sample.

In this way, the encoder may determine whether to merge CUs with similar characteristics, taking into consideration the characteristics of the image, and then may inform the decoder of the determination result. This allows the decoder to perform decoding procedures by merging the CUs with the similar characteristics. As a result, auxiliary information to be received and processed is reduced, and, thus, coding efficiency may be improved.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

The above-described method according to the present invention may be implemented in a software form. The encoder and/or decoder according to the present invention may be included in a device that performs image processing in, a for example, TV, a computer, a smart phone, a set-top box, a display device, and the like.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A method for decoding a picture by a decoder, the method comprising:

receiving split flag information, and quad-tree merge flag information;

splitting, based on the split flag information, a coding unit (CU) on a depth n into CUs on a depth n+1 in a quad-tree structure, wherein the CUs on the depth n+1 include a first CU on the depth n+1 and a second CU on the depth n+1;

splitting, based on the split flag information, the second CU on the depth n+1 into CUs on a depth n+2 in the quad-tree structure;

generating, based on the quad-tree merge flag information, a merged CU by merging the first CU on the depth n+1 with at least one of the CUs on the depth n+2, wherein an intra prediction is applied to the merged CU;

generating, based on the intra prediction, a prediction block related to the merged CU; and generating a reconstructed block based on the prediction block and a residual block, wherein the at least one of the CUs on the depth n+2 is located in a region of the second CU on the depth n+1, and wherein a size of the first CU on the depth n+1 is different from a size of each of the CUs on the depth n+2.

2. The method of claim 1, wherein the first CU on the depth n+1 and the at least one of the CUs on the depth n+2 are adjacent to each other.

3. The method of claim 1, wherein the merged CU has a square structure that traverses the first CU on the depth n+1 and the second CU on the depth n+1.

4. The method of claim 1, wherein the merged CU is generated by merging the first CU on a depth n+1 and two of the CUs on the depth n+2.

5. The method of claim 1, wherein, based on the size of the CUs on the depth n+1 being N×N, a size of the merged CU is 3N×3N.

6. The method of claim 1, further comprising:
receiving merge type information based on a value of the quad-tree merge flag information indicating 1; and
determining a merge type of the merged CU based on the merge type information.

7. The method of claim 1, wherein the first CU on the depth n+1 and the at least one of the CUs on the depth n+2 that are merged into the merged CU include pixels for a same object.

8. The method of claim 1, wherein a value of a split flag for the first CU on the depth n+1 is zero and a value of a split flag for the second CU on the depth n+1 is one.

* * * * *